United States Patent
Muller et al.

(10) Patent No.: US 10,394,543 B2
(45) Date of Patent: Aug. 27, 2019

(54) LIFECYCLE OBJECTIFICATION OF NON-ACTIVITY OBJECTS IN AN ACTIVITY THREAD

(75) Inventors: Michael Muller, Medford, MA (US); Andrew L. Schirmer, Andover, MA (US); Paul B. Moody, Hyde Park, VT (US)

(73) Assignee: International Business Machines Corporation, Armonk, NY (US)

( * ) Notice: Subject to any disclaimer, the term of this patent is extended or adjusted under 35 U.S.C. 154(b) by 2383 days.

(21) Appl. No.: 11/567,969

(22) Filed: Dec. 7, 2006

(65) Prior Publication Data

US 2007/0094068 A1    Apr. 26, 2007

Related U.S. Application Data

(63) Continuation-in-part of application No. 11/040,427, filed on Jan. 21, 2005.

(51) Int. Cl.

| | |
|---|---|
| *G06Q 10/06* | (2012.01) |
| *G06Q 10/10* | (2012.01) |
| *G06F 16/93* | (2019.01) |
| *G06F 8/65* | (2018.01) |

(52) U.S. Cl.
CPC ............... *G06F 8/65* (2013.01); *G06F 16/93* (2019.01); *G06Q 10/067* (2013.01); *G06Q 10/10* (2013.01); *G06Q 10/101* (2013.01)

(58) Field of Classification Search
CPC .............................. G06Q 10/10; G06F 16/93
See application file for complete search history.

(56) References Cited

U.S. PATENT DOCUMENTS

| | | | |
|---|---|---|---|
| 6,640,255 B1 | 10/2003 | Snyder et al. | |
| 7,346,518 B1 * | 3/2008 | Frank | G06Q 10/063 705/310 |
| 2002/0075293 A1 * | 6/2002 | Charisius et al. | 345/704 |
| 2002/0194181 A1 | 12/2002 | Wachtel | |
| 2003/0050812 A1 * | 3/2003 | Clark et al. | 705/7 |
| 2003/0110096 A1 | 6/2003 | Dathi | |
| 2003/0135401 A1 * | 7/2003 | Parr | G06Q 10/06 705/7.23 |
| 2004/0017400 A1 * | 1/2004 | Ly et al. | 345/810 |
| 2004/0153465 A1 * | 8/2004 | Singleton et al. | 707/100 |
| 2005/0027757 A1 * | 2/2005 | Kiessig et al. | 707/204 |
| 2005/0228832 A1 | 10/2005 | Ghotge et al. | |

(Continued)

*Primary Examiner* — Kira Nguyen
(74) *Attorney, Agent, or Firm* — Steven M. Greenberg, Esq.; Shutts & Bowen LLP

(57) ABSTRACT

Embodiments of the present invention address deficiencies of the art in respect to state awareness of a non-live object, and provide a method, system and computer program product for lifecycle model instance objectification of a non-activity object in an activity thread. In one embodiment of the invention, a method for lifecycle model instance objectification of non-activity objects in an activity thread can be provided. The method can include rendering an activity thread within an activity map for an activity-centric collaborative tool, creating an instance of a lifecycle model, and objectifying a non-activity object in the activity thread with the lifecycle model instance. Additionally, a status decorator can be displayed for the lifecycle model instance in association with the non-activity object in the activity map.

17 Claims, 2 Drawing Sheets

(56) References Cited

U.S. PATENT DOCUMENTS

2005/0246378 A1   11/2005  Hunt
2005/0251505 A1*  11/2005  McCauley et al. ............... 707/2
2006/0045461 A1*   3/2006  Oikawa ........................... 386/46
2006/0048224 A1    3/2006  Duncan et al.
2006/0053196 A1*   3/2006  Spataro et al. ............... 709/205
2006/0143219 A1*   6/2006  Smith .................... G06Q 10/06

* cited by examiner

LIFECYCLE OBJECTIFICATION OF NON-ACTIVITY OBJECTS IN AN ACTIVITY THREAD

CROSS-REFERENCE TO RELATED APPLICATIONS

This patent application claims the benefit under 35 U.S.C. § 120 as a continuation-in-part of presently pending U.S. patent application Ser. No. 11/040,427, entitled WRAPPING NON-LIVE OBJECTS FOR LIVENESS, filed on Jan. 21, 2005, the entire teachings of which are incorporated herein by reference.

BACKGROUND OF THE INVENTION

Field of the Invention

The present invention relates to the field of collaborative computing and more particularly to the status awareness of objects in a collaborative computing environment.

Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among groups as small as two people, or as large as a world-wide community. Thus, different collaborative applications may focus upon groups of different sizes. No longer merely restricted to document sharing, the modern collaborative environment can include document libraries, chat rooms, video conferencing, application sharing, and discussion forums to name only a few.

A collaborative computing application enjoys substantial advantages over a more conventional, individualized computing application. Specifically, at present it is rare that a goal of any importance is entrusted and reliant upon a single person. In fact, many goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

To facilitate collaborative aspects of a process, collaborative environments often incorporate the concept of a "live name". A live name is a reference within the collaborative environment to a collaborator which indicates the presence of the collaborator associated with that name. For example, the live name can indicate whether the collaborator has "logged in" or whether the collaborator has not utilized the collaborator's computer for some time—an idle state. Live names may also provide additional information about the person whose name appears. For example, in an organizational setting, a user may query on a live name in order to see the job title of the named collaborator, or to communicate with the named collaborator. Live names have been most widely utilized in the collaborative chat tool where it can be helpful to know whether a collaborator is available for an online discussion, and to be able to invoke a chat by a simple operation performed upon the collaborator's name.

As an extension of the live name concept, the "live object" can provide similar, collaborative advantages. A live object refers to a reference within the collaborative environment to a document which indicates the current status of the document, for example whether or not the document is in use. The live object also can indicate the identity of a collaborator using the document. In this way, collaborators need not work in isolation towards a common goal. Rather, a team environment can be promoted by the awareness of the presence and activities of fellow collaborators in a collaborative environment.

Notwithstanding the effective notion of a live name or live object, online collaborations seldom are limited to preconfigured live objects. Rather, in many circumstances, collaborators utilize garden variety objects such as documents and files which are created outside of the collaborative environment which supports "liveness". Accordingly, an awareness of the state of a non-live object and the application of actions based upon the state of non-live actions can arise only manually through the multiple observations of different states of different objects and collaborators. Consequently, in many circumstances, important conditions can go unrecognized.

BRIEF SUMMARY OF THE INVENTION

Embodiments of the present invention address deficiencies of the art in respect to state awareness of a non-live object, and provide a novel and non-obvious method, system and computer program product for lifecycle model instance objectification of a non-activity object in an activity thread. In one embodiment of the invention, a method for lifecycle model instance objectification of non-activity objects in a structured or unstructured arrangement of activities and tasks and non-activity objects, hereinafter an "activity thread" can be provided. The method can include rendering an activity thread within an activity map for an activity-centric collaborative tool, creating an instance of a lifecycle model, and objectifying a non-activity object in the activity thread with the lifecycle model instance. Optionally, a status decorator can be displayed for the lifecycle model instance in association with the non-activity object in the activity map.

In another embodiment of the invention, an activity-centric collaborative data processing system can be provided. The system can include an activity-centric collaboration tool configured to produce and manage an activity map of activity threads, each thread comprising both activity/task objects and non-activity/task objects. The system further can include activity objectification logic including program code enabled to wrap the non-activity/task objects with activity-centric meta-data. Finally, the system can include lifecycle management logic coupled to the activity objectification logic. The lifecycle management logic can include program code enabled to associate the non-activity/task objects with meta-data reflective of different instances of different lifecycle models.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for lifecycle objectification of objects in an activity thread. In accordance with an embodiment of the present invention, an object with an activity thread of an activity-centric collaborative application can be wrapped with a reference to a lifecycle model instance. A decorator can be applied to the object in an activity map of the activity thread indicating a live status of the lifecycle model instance. Optionally, the decorator can include all stages in the lifecycle model instance including a live indication of completeness for each of the stages. Finally, the decorator can be configured to accept a user indication of completeness for all or a portion of the lifecycle model instance for the object.

Figure 1:
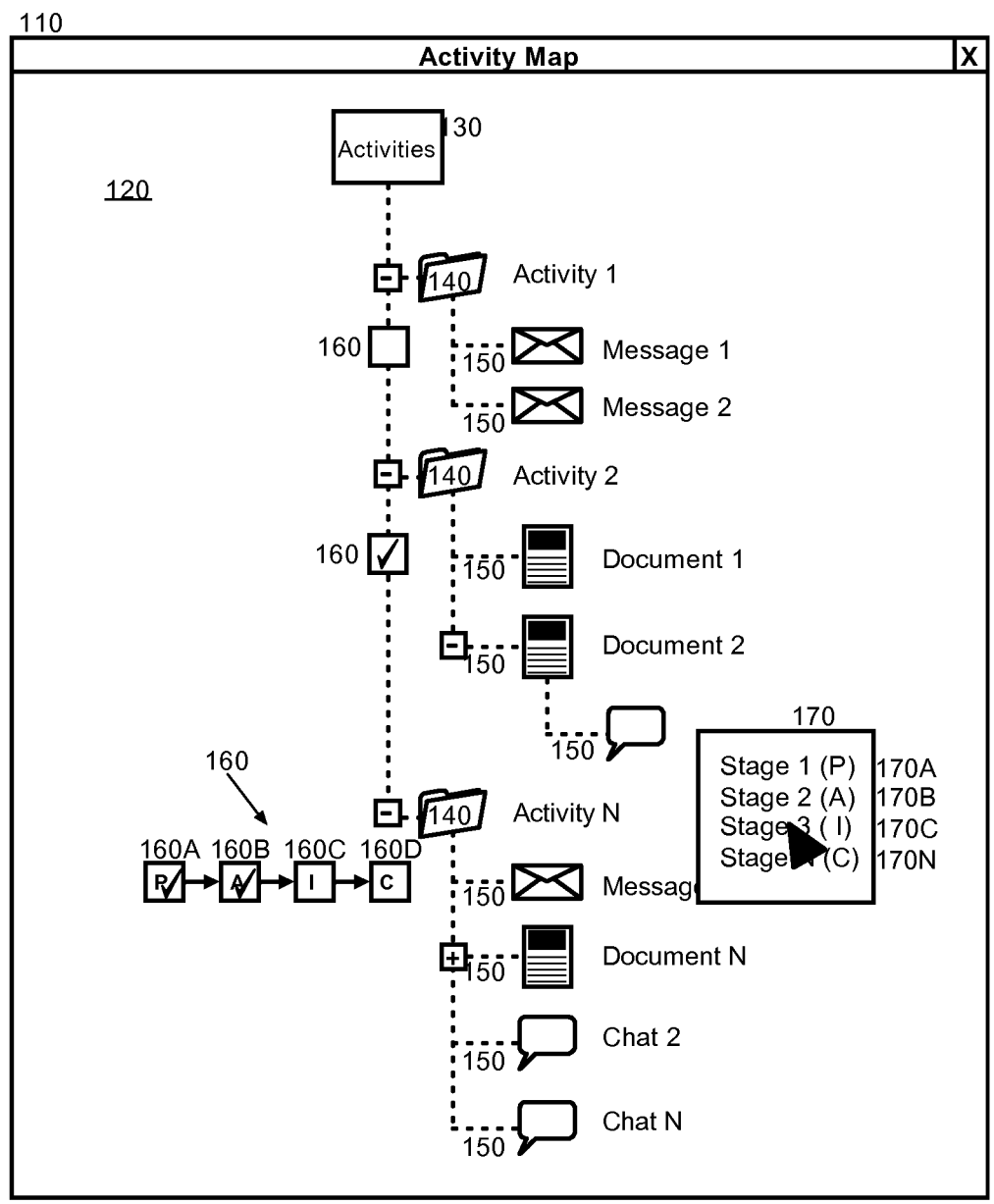
FIG. 1 is a pictorial illustration of an activity map in an activity-centric collaborative application configured for lifecycle objectification of objects.

In illustration, FIG. 1 is a pictorial illustration of an activity map in an activity-centric collaborative application configured for lifecycle objectification of objects. As shown in FIG. 1, an activity map 110 can be provided in a user interface to an activity-centric collaboration tool. The activity map 110 can include a hierarchical display 120 of activities 130 including one or more activity threads 140. Each of the activity threads 140 can include not only activity objects such as tasks for an activity, but also non-activity objects 150 including messages, chats and documents. Non-activity objects 150 can be activity objectified by associating activity-centric meta-data with the non-activity object and an activity decorator 160. In this way, non-activity objects 150 used to represent activity concepts can be decorated with suitable activity-centric user interface elements and configured for activity-centric logic.

The activity meta-data can include not only whether or not an activity object has been completed, but also the activity meta-data can include a lifecycle model instance and a contemporary status for the lifecycle model instance. In this regard, a lifecycle model instance can include a hierarchy of stages of an activity as opposed to a more unitary complete/not complete status. The hierarchy can be a simple sequence of stages from inception to completion, or a complex tree of many different branches. Examples include "not-begun, in-progress, completed", "assigned, draft-complete, approved, published, expired", "proposed, costed, assigned, draft-complete, manager-approved, executive-approved, final, doc-number-assigned, posted-to-site, superceded", "stubbed, checked-out, clean-compiled, checked-in, inspection-passed, linked, unit-test-passed, integration-test-passed, beta, gold", and "received, screened, assigned, problem-verified, fixed, customer-informed, closed".

Optionally, a lifecycle model can be derived from a Gantt chart or Pert chart by reading in the names of each stage of a project plan. Additionally, the estimated time for completion of each stage can be imported into the lifecycle model form the Gantt chart or Pert chart. Once a lifecycle model has been selected for a non-activity object 150, an instance of the lifecycle model can be created, a current status within the instance determined and associated with the non-activity object 150. Thereafter, a decorator 160 can be rendered in the activity map 110 in association with the non-activity object 160. The decorator can range from an indication of completeness of a stage of the lifecycle model instance, to a sequence of stages including each node 160A, 160B, 160C, 160D of the lifecycle model instance, each stage providing an indication of completeness.

Once a lifecycle model instance has been associated with a non-activity object 150, access to the different stages of the lifecycle model instance for the non-activity object can be provided through pop-up menu 170. The pop-up menu 170 can include a listing of the different stages 170A, 170B, 170C, 170N of the associated lifecycle model instance for the non-activity object 150. A particular one of the stages 170A, 170B, 170C 170N can be selected to indicate a contemporary status for the lifecycle model instance for the non-activity object 150. Optionally, to the extent that an associated lifecycle model instance is a tree structure, nested menus can be provided to selected different sub-stages in response to which the menu choices for the associated stages can change accordingly.

Figure 2:
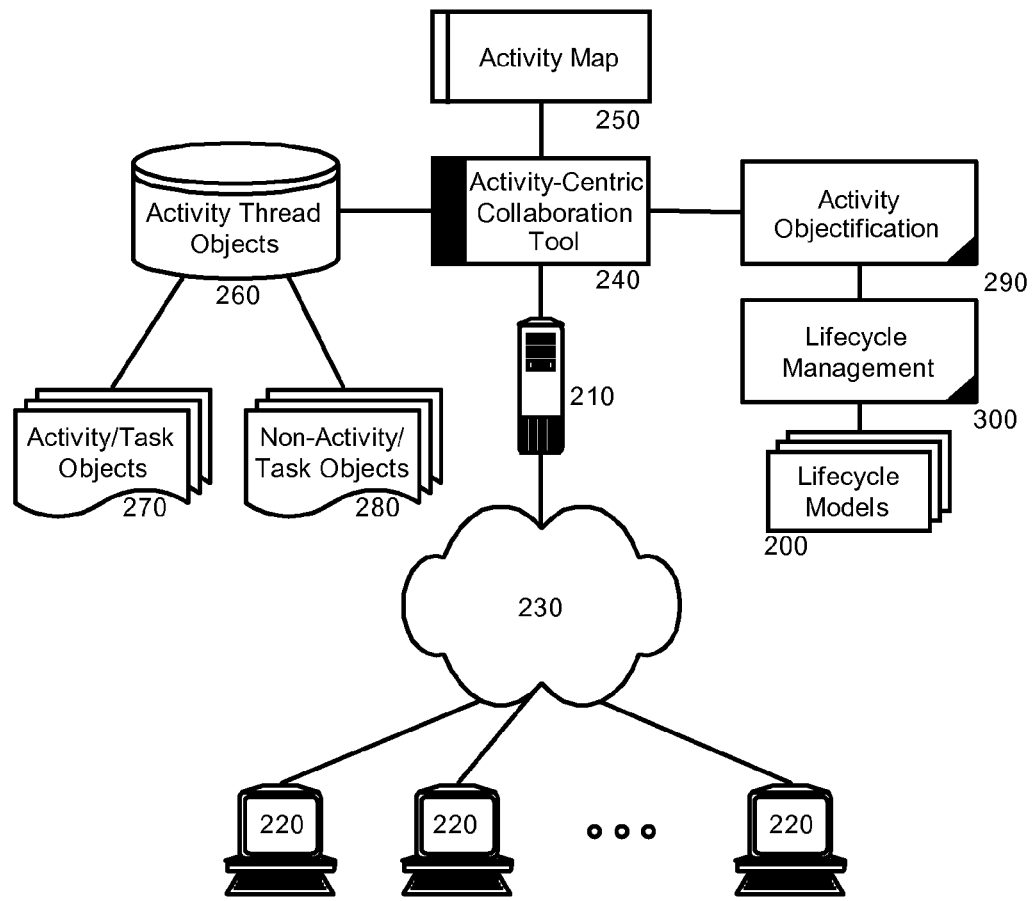
FIG. 2 is a schematic illustration of an activity-centric collaborative environment configured for lifecycle objectification of objects in an activity thread; and, FIG. 3 is a flow chart illustrating a process for lifecycle objectification of objects in an activity thread.

In further illustration, FIG. 2 is a schematic illustration of an activity-centric collaborative environment configured for lifecycle objectification of objects in an activity thread. The system can include a collaborative host 210 coupled to one or more collaborative clients 220 over a computer communications network 230. The collaborative host 210 can support the operation of an activity-centric collaboration tool 240 for use by collaborative end users through the collaborative clients 220. To facilitate the collaborative interaction between the collaborative end users, a view to an activity map 250 can be provided through the activity-centric collaboration tool 240 such that activity threads involving different groups of collaborative end users can be presented visually in an activity-centric way.

The activity-centric collaboration tool 240 can manage the arrangement and progression of different activity thread objects 260 for different activity threads presented in the activity map 250. Those different activity thread objects 260 can include not only activity and task objects inherently configured to behave in an activity-centric way, but also non-activity/task objects 280 such as documents, mail messages and chats that are not inherently configured to behave in an activity-centric way. Notwithstanding, activity objectification logic 290 coupled to the activity-centric collaboration tool 240 can include program code enabled to apply and activity meta-data for the non-activity/task objects 280 so as to activity objectify the non-activity/task objects 280.

Notably, lifecycle management logic 300 can be coupled to the activity objectification logic 290. The lifecycle management logic 300 can include program code enabled to create and associate instances of selected lifecycle models to different ones of the non-activity/task objects 280. In this regard, the different ones of the non-activity/task objects 280 can be rendered live by associating the non-activity/task objects 280 in a live environment where lifecycle model instance data can be tracked in association with the non-activity/task objects 280.

Figure 3:
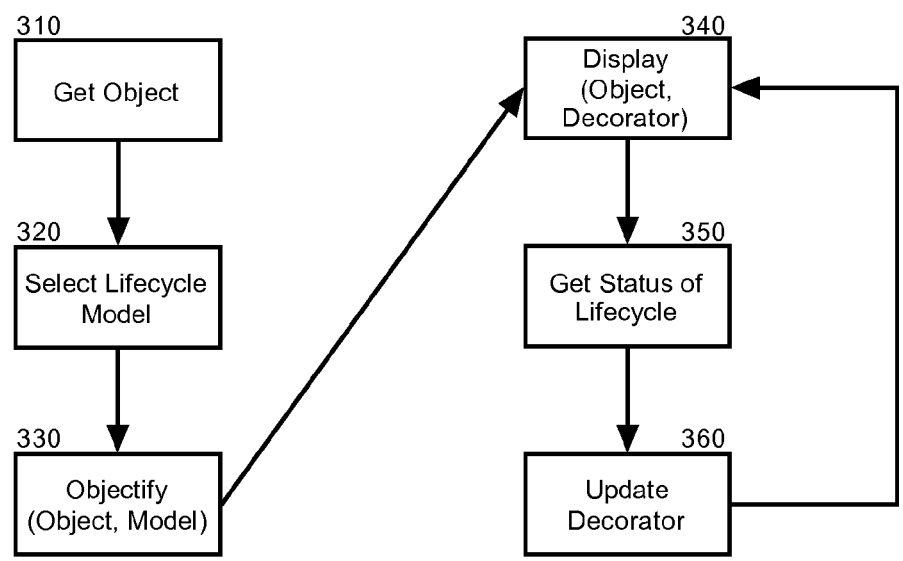

In yet further illustration, FIG. 3 is a flow chart illustrating a process for lifecycle objectification of objects in an activity thread. In block 310, an object in an activity thread can be retrieved for objectification. In block 320, a lifecycle model can be selected for association with the object in the activity thread. In block 330, the retrieved object can be objectified with an instance of the selected lifecycle model. Thereafter, in block 340 a decorator for the object can be displayed in an activity map for the activity thread along side the object itself.

Periodically, the status of the lifecycle can be determined by nature of the liveness of the object. In this regard, in block 350, a status can be retrieved for the lifecycle instance for the object. In block 360, the decorator for the object can be updated to reflect changes in the status of the lifecycle instance. Thereafter, the decorator can be re-displayed for the object in the activity map. This process can continue so long as the lifecycle model instance remains associated with the object or for the duration of the display of the activity thread in the activity map.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for lifecycle model instance objectification of non-activity objects in an activity thread, the method comprising:
   rendering in a window of a graphical user interface (GUI) of a host computer as a collapsible tree, an activity thread within an activity map for an activity-centric collaborative tool, the activity thread comprising both activity objects and non-activity objects;
   selecting one of the non-activity objects in the activity thread through the GUI;
   creating for the selected one of the non-activity objects in the host computer, an instance of a lifecycle model by lifecycle management logic executing in memory of a computer, the instance of the lifecycle model comprising a hierarchy of a multiplicity of different stages, and determining a status within the created instance in respect to each one of the stages of the lifecycle model instance of the selected one of the non-activity objects;
   objectifying the selected one of the non-activity objects in the activity thread with the created lifecycle model instance by associating the determined status of the created instance in respect to the current one of the stages of the lifecycle model instance of the selected one of the non-activity objects with the selected one of the non-activity objects;
   rendering in the GUI both a display in the activity map of a multiplicity of decorators, each of the decorators in connection with a corresponding different stage of the selected one of the non-activity objects, the decorators being displayed in sequence from a first stage to a last stage and including in between one or more intermediate stages of the lifecycle mode, each of the decorators indicating a degree of completeness of a corresponding one of the stages of the lifecycle model instance based upon the determined statuses so that when an intermediate one of the decorators is marked as complete, so too is a first one of the decorators and also every one of the decorators positioned in the GUI between the first one of the decorators and the intermediate one of the of the decorators, and also, concurrently displaying with the decorators and on top of the hierarchy of the activity map in a separate window than a window of displaying the activity map, a pop-up menu including a listing of the different stages of the instance of the lifecycle model for the non-activity object, each one of the stages being configured for selection in response to which a contemporary status for the lifecycle model instance for the non-activity object is indicated in the GUI by marking complete another one of the decorators in the sequence not previously marked as complete; and,
   configuring each of the decorators to accept a user indication of completeness for all or a portion of the lifecycle model instance.

2. The method of claim 1, wherein creating an instance of a lifecycle model, comprises:
   selecting a lifecycle model from among a plurality of different lifecycle models; and,
   creating an instance of the selected lifecycle model.

3. The method of claim 1, wherein creating an instance of a lifecycle model, comprises:

selecting a lifecycle model from among a plurality of different lifecycle models selected from the group consisting of
(A) "not-begun, in-progress, completed",
(B) "assigned, draft-complete, approved, published, expired",
(C) "proposed, costed, assigned, draft-complete, manager-approved, executive-approved, final, doc-number-assigned, posted-to-site, superceded",
(D) "stubbed, checked-out, clean-compiled, checked-in, inspection-passed, linked, unit-test-passed, integration-test-passed, beta, gold", and
(E) "received, screened, assigned, problem-verified, fixed, customer-informed, closed"; and,
creating an instance of the selected lifecycle model.

4. The method of claim 1, wherein creating an instance of a lifecycle model, comprises:
loading a Gantt chart for a project plan;
creating stages in a lifecycle model for each stage of the project plan; and,
creating an instance of the lifecycle model.

5. The method of claim 1, wherein creating an instance of a lifecycle model, comprises:
loading a Pert chart for a project plan;
creating stages in a lifecycle model for each stage of the project plan; and,
creating an instance of the lifecycle model.

6. The method of claim 1, wherein the status decorator displays a sequence of stages for the lifecycle model instance.

7. The method of claim 1, further comprising:
accepting a selection of one of the different stages in the pop-up menu that is concurrently displayed with the decorator; and,
modifying the lifecycle model instance to include the selected one of the different stages as a contemporary stage.

8. An activity-centric collaborative data processing system comprising:
a computer with at least one processor and memory;
an activity-centric collaboration tool configured to produce and manage an activity map of activity threads, each thread comprising both activity objects and non-activity objects and to render the activity map in a window of a graphical user interface (GUI) of the computer as a collapsible tree;
activity objectification logic comprising program code enabled upon execution in the memory of the computer to select one of the non-activity objects in the activity thread through the GUI and to wrap the selected one of the non-activity objects with activity-centric meta-data; and,
lifecycle management logic coupled to the activity objectification logic, the lifecycle management logic comprising program code enabled upon execution in the memory of the computer to create for the selected one of the non-activity objects in the host computer, an instance of a lifecycle model by lifecycle management logic executing in memory of a computer, the instance of the lifecycle model comprising a hierarchy of a multiplicity of different stages, and determine a status within the created instance in respect to a current one of the stages of the lifecycle model instance of the selected one of the non-activity objects, to objectify the selected one of the non-activity objects in the activity thread with the created lifecycle model instance by associating the determined status of the created instance in respect to the current one of the stages of the lifecycle model instance of the selected one of the non-activity objects with the selected one of the non-activity objects, to render in the GUI both a display in the activity map of a multiplicity of decorators, each of the decorators in connection with a corresponding different stage of the selected one of the non-activity objects, the decorators being displayed in sequence from a first stage to a last stage and including in between one or more intermediate stages of the lifecycle mode, each of the decorators indicating a degree of completeness of a corresponding one of the stages of the lifecycle model instance based upon the determined statuses so that when an intermediate one of the decorators is marked as complete, so too is a first one of the decorators and also every one of the decorators positioned in the GUI between the first one of the decorators and the intermediate one of the of the decorators, and also, concurrently displaying with the decorators and on top of the hierarchy of the activity map in a separate window than a window of displaying the activity map, a pop-up menu including a listing of the different stages of the instance of the lifecycle model for the non-activity object, each one of the stages being configured for selection in response to which a contemporary status for the lifecycle model instance for the non-activity object is indicated in the GUI by marking complete another one of the decorators in the sequence not previously marked as complete, and configure each of the decorators to accept a user indication of completeness for all or a portion of the lifecycle model instance.

9. A computer program product comprising a non-transitory computer usable medium embodying computer usable program code for lifecycle model instance objectification of non-activity objects in an activity thread, the computer program product comprising:
computer usable program code for rendering in a window of a graphical user interface (GUI) of a host computer as a collapsible tree, an activity thread within an activity map for an activity-centric collaborative tool, the activity thread comprising both activity objects and non-activity objects;
computer usable program code for selecting one of the non-activity objects in the activity thread through the GUI;
computer usable program code for creating for the selected one of the non-activity objects in the host computer, an instance of a lifecycle model by lifecycle management logic executing in memory of a computer, the instance of the lifecycle model comprising a hierarchy of a multiplicity of different stages, and determining a status within the created instance in respect to a current one of the stages of the lifecycle model instance of the selected one of the non-activity objects;
computer usable program code for objectifying the selected one of the non-activity objects in the activity thread with the created lifecycle model instance by associating the determined status of the created instance in respect to the current one of the stages of the lifecycle model instance of the selected one of the non-activity objects with the selected one of the non-activity objects;
computer usable program code for rendering in the GUI both a display in the activity map of a multiplicity of decorators, each of the decorators in connection with a corresponding different stage of the selected one of the non-activity objects, the decorators being displayed in sequence from a first stage to a last stage and including in between one or more intermediate stages of the lifecycle mode, each of the decorators indicating a degree of completeness of a corresponding one of the stages of the lifecycle model instance based upon the determined statuses so that when an intermediate one of the decorators is marked as complete, so too is a first one of the decorators and also every one of the decorators positioned in the GUI between the first one of the decorators and the intermediate one of the of the decorators, and also, concurrently displaying with the decorators and on top of the hierarchy of the activity map in a separate window than a window of displaying the activity map, a pop-up menu including a listing of the different stages of the instance of the lifecycle model for the non-activity object, each one of the stages being configured for selection in response to which a contemporary status for the lifecycle model instance for the non-activity object is indicated in the GUI by marking complete another one of the decorators in the sequence not previously marked as complete; and, computer usable program code for configuring each of the decorators to accept a user indication of completeness for all or a portion of the lifecycle model instance.

10. The computer program product of claim 9, further comprising computer usable program code for displaying a status decorator for the lifecycle model instance in association with the non-activity object in the activity map.

11. The computer program product of claim 10, wherein the computer usable program code for displaying a status decorator for the lifecycle model instance in association with the non-activity object in the activity map, comprises computer usable program code for displaying a sequence of stages for the lifecycle model instance in association with the non-activity object in the activity map.

12. The computer program product of claim 9, wherein the computer usable program code for creating an instance of a lifecycle model, comprises:

computer usable program code for selecting a lifecycle model from among a plurality of different lifecycle models; and, computer usable program code for creating an instance of the selected lifecycle model.

13. The computer program product of claim 9, wherein the computer usable program code for creating an instance of a lifecycle model, comprises:

computer usable program code for selecting a lifecycle model from among a plurality of different lifecycle models selected from the group consisting of (A) "not-begun, in-progress, completed",
(B) "assigned, draft-complete, approved, published, expired",
(C) "proposed, costed, assigned, draft-complete, manager-approved, executive-approved, final, doc-number-assigned, posted-to-site, superceded",
(D) "stubbed, checked-out, clean-compiled, checked-in, inspection-passed, linked, unit-test-passed, integration-test-passed, beta, gold", and
(E) "received, screened, assigned, problem-verified, fixed, customer-informed, closed"; and, computer usable program code for creating an instance of the selected lifecycle model.

14. The computer program product of claim 9, wherein the computer usable program code for creating an instance of a lifecycle model, comprises:

computer usable program code for loading a Gantt chart for a project plan;

computer usable program code for creating stages in a lifecycle model for each stage of the project plan; and, computer usable program code for creating an instance of the lifecycle model.

15. The computer program product of claim 9, wherein the computer usable program code for creating an instance of a lifecycle model, comprises:

computer usable program code for loading a Pert chart for a project plan;

computer usable program code for creating stages in a lifecycle model for each stage of the project plan; and, computer usable program code for creating an instance of the lifecycle model.

16. The computer program product of claim 9, wherein the computer usable program code for objectifying a non-activity object in the activity thread with the lifecycle model instance, comprises:

computer usable program code for storing meta-data for the lifecycle model instance, the meta-data comprising a contemporary stage for the lifecycle model instance, and a completeness indication for each stage in the lifecycle model instance; and, computer usable program code for associating the stored meta-data with the non-activity object.

17. The computer program product of claim 9, further comprising:

computer usable program code for accepting a selection of one of the different stages in the pop-up menu that is concurrently displayed with the decorator; and, computer usable program code for modifying the lifecycle model instance to include the selected one of the different stages as a contemporary stage.

* * * * *